US012683875B1

(12) United States Patent
    Rajagopalan

(10) Patent No.:     US 12,683,875 B1
(45) Date of Patent:          Jul. 14, 2026

(54) HANDLING INCONSISTENCIES BETWEEN SERVICE PROVISIONING BY NETWORK DEVICES

(71) Applicant: Juniper Networks, Inc., Sunnyvale, CA (US)

(72) Inventor: Balaji Rajagopalan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 68 days.

(21) Appl. No.: 18/812,199

(22) Filed: Aug. 22, 2024

(51) Int. Cl.
    *H04L 41/5054*        (2022.01)
    *H04L 41/0668*        (2022.01)
    *H04L 41/14*          (2022.01)
    *H04L 43/0811*        (2022.01)

(52) U.S. Cl.
    CPC ...... *H04L 41/5054* (2013.01); *H04L 41/0668* (2013.01); *H04L 41/145* (2013.01); *H04L 43/0811* (2013.01)

(58) Field of Classification Search
    None
    See application file for complete search history.

(56)                 References Cited

U.S. PATENT DOCUMENTS

2021/0385149 A1*  12/2021  Suryanarayana ....... H04L 12/66
2023/0370328 A1*  11/2023  Kim ........................ G06F 9/453

* cited by examiner

*Primary Examiner* — Fadi Haj Said
(74) *Attorney, Agent, or Firm* — Harrity & Harrity, LLP

(57)                 ABSTRACT

A device may receive a request for service requirements, and may determine network devices that satisfy the service requirements. The device may identify an unreachable network device from the network devices determined to satisfy the service requirements, and may deny the request based on the unreachable network device being unreachable. The device may receive a command to proceed with the request, and may create an orphan service instance for resources used by the unreachable network device and service instances for resources used by the remaining network devices. The device may associate a first device status with the orphan service instance, and may associate second device statuses with the service instances. The device may generate a service design based on the orphan service instance, the service instances, the first device status, and the second device statuses, and may utilize the service design to satisfy the service requirements.

20 Claims, 12 Drawing Sheets

500 ⟶

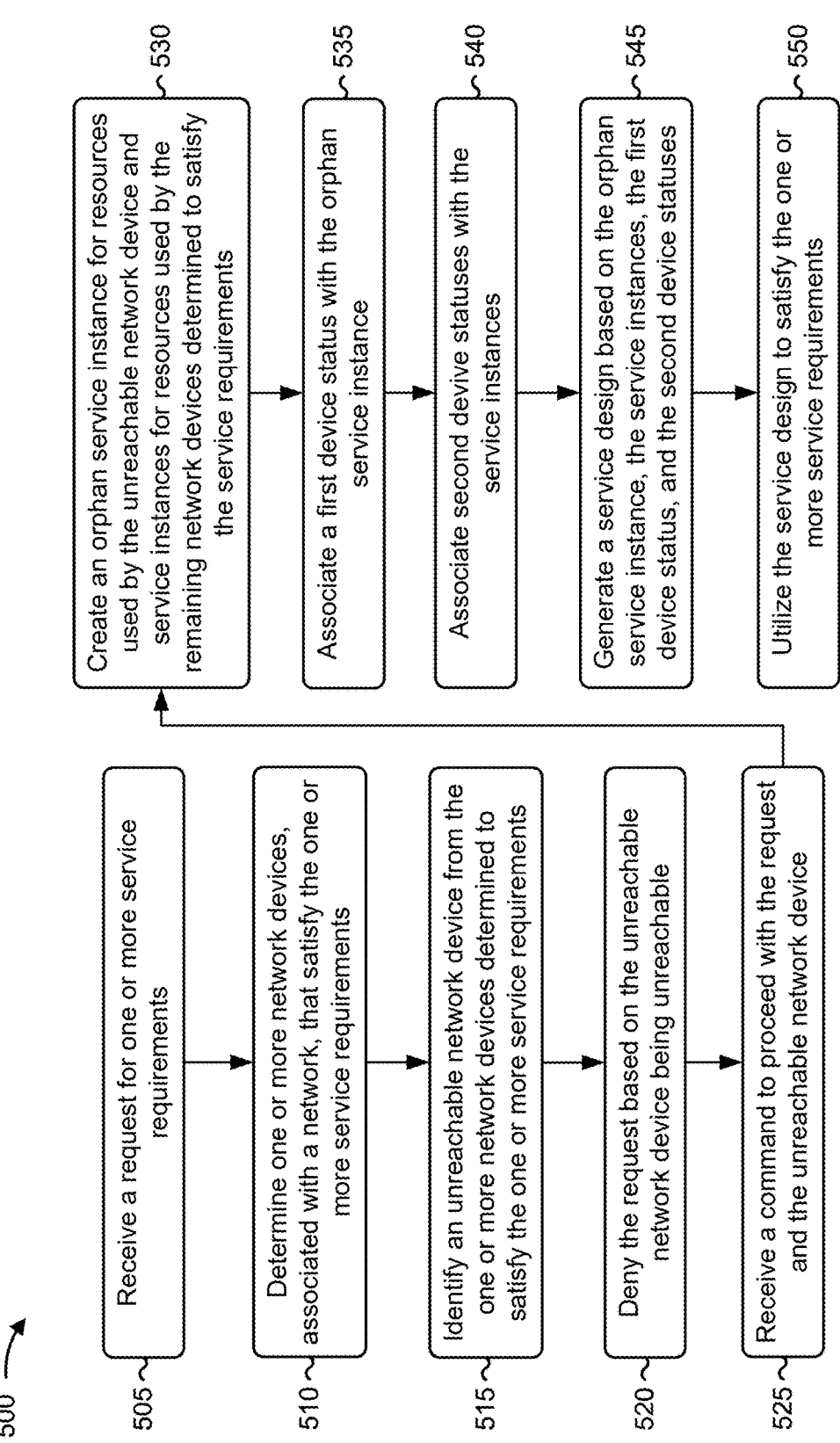

505 — Receive a request for one or more service requirements

510 — Determine one or more network devices, associated with a network, that satisfy the one or more service requirements 515 — Identify an unreachable network device from the one or more network devices determined to satisfy the one or more service requirements 520 — Deny the request based on the unreachable network device being unreachable 525 — Receive a command to proceed with the request and the unreachable network device 530 — Create an orphan service instance for resources used by the unreachable network device and service instances for resources used by the remaining network devices determined to satisfy the service requirements 535 — Associate a first device status with the orphan service instance 540 — Associate second devive statuses with the service instances 545 — Generate a service design based on the orphan service instance, the service instances, the first device status, and the second device statuses 550 — Utilize the service design to satisfy the one or more service requirements

HANDLING INCONSISTENCIES BETWEEN SERVICE PROVISIONING BY NETWORK DEVICES

BACKGROUND

A service provisioning system accepts service requirements from an endpoint device (e.g., a user) and translates the service requirements into a network configuration for realization of the service requirements.

SUMMARY

Some implementations described herein relate to a method. The method may include receiving a request for one or more service requirements, and determining one or more network devices, associated with a network, that satisfy the one or more service requirements. The method may include identifying an unreachable network device from the one or more network devices determined to satisfy the one or more service requirements, and denying the request based on the unreachable network device being unreachable. The method may include receiving a command to proceed with the request and the unreachable network device, and creating an orphan service instance for resources used by the unreachable network device and service instances for resources used by the remaining network devices determined to satisfy the one or more service requirements. The method may include associating a first device status with the orphan service instance, and associating second device statuses with the service instances. The method may include generating a service design based on the orphan service instance, the service instances, the first device status, and the second device statuses, and utilizing the service design to satisfy the one or more service requirements.

Some implementations described herein relate to a device. The device may include one or more memories and one or more processors. The one or more processors may be configured to receive a request for one or more service requirements, and determine one or more network devices, associated with a network, that satisfy the one or more service requirements. The one or more processors may be configured to identify an unreachable network device from the one or more network devices determined to satisfy the one or more service requirements, and deny the request based on the unreachable network device being unreachable. The one or more processors may be configured to receive a command to proceed with the request and the unreachable network device, and create an orphan service instance for resources used by the unreachable network device and service instances for resources used by the remaining network devices determined to satisfy the one or more service requirements. The one or more processors may be configured to associate a first device status with the orphan service instance, and associate second device statuses with the service instances, wherein the first device status is a down device status and each of the second device statuses is an up device status. The one or more processors may be configured to generate a service design based on the orphan service instance, the service instances, the first device status, and the second device statuses, and utilize the service design to satisfy the one or more service requirements.

Some implementations described herein relate to a non-transitory computer-readable medium that stores a set of instructions. The set of instructions, when executed by one or more processors of a device, may cause the device to receive, from an endpoint device, a request for one or more service requirements, and determine one or more network devices, associated with a network, that satisfy the one or more service requirements. The set of instructions, when executed by one or more processors of the device, may cause the device to identify an unreachable network device from the one or more network devices determined to satisfy the one or more service requirements, and deny the request based on the unreachable network device being unreachable. The set of instructions, when executed by one or more processors of the device, may cause the device to receive a command to proceed with the request and the unreachable network device, and create an orphan service instance for resources used by the unreachable network device and service instances for resources used by the remaining network devices determined to satisfy the one or more service requirements. The set of instructions, when executed by one or more processors of the device, may cause the device to associate a first device status with the orphan service instance, and associate second device statuses with the service instances. The set of instructions, when executed by one or more processors of the device, may cause the device to generate a service design based on the orphan service instance, the service instances, the first device status, and the second device statuses, and utilize the service design to satisfy the one or more service requirements for the endpoint device.

BRIEF DESCRIPTION OF THE DRAWINGS

FIG. 5 is a flowchart of an example process for handling inconsistencies between service provisioning by network devices.

DETAILED DESCRIPTION

Figure 1A:
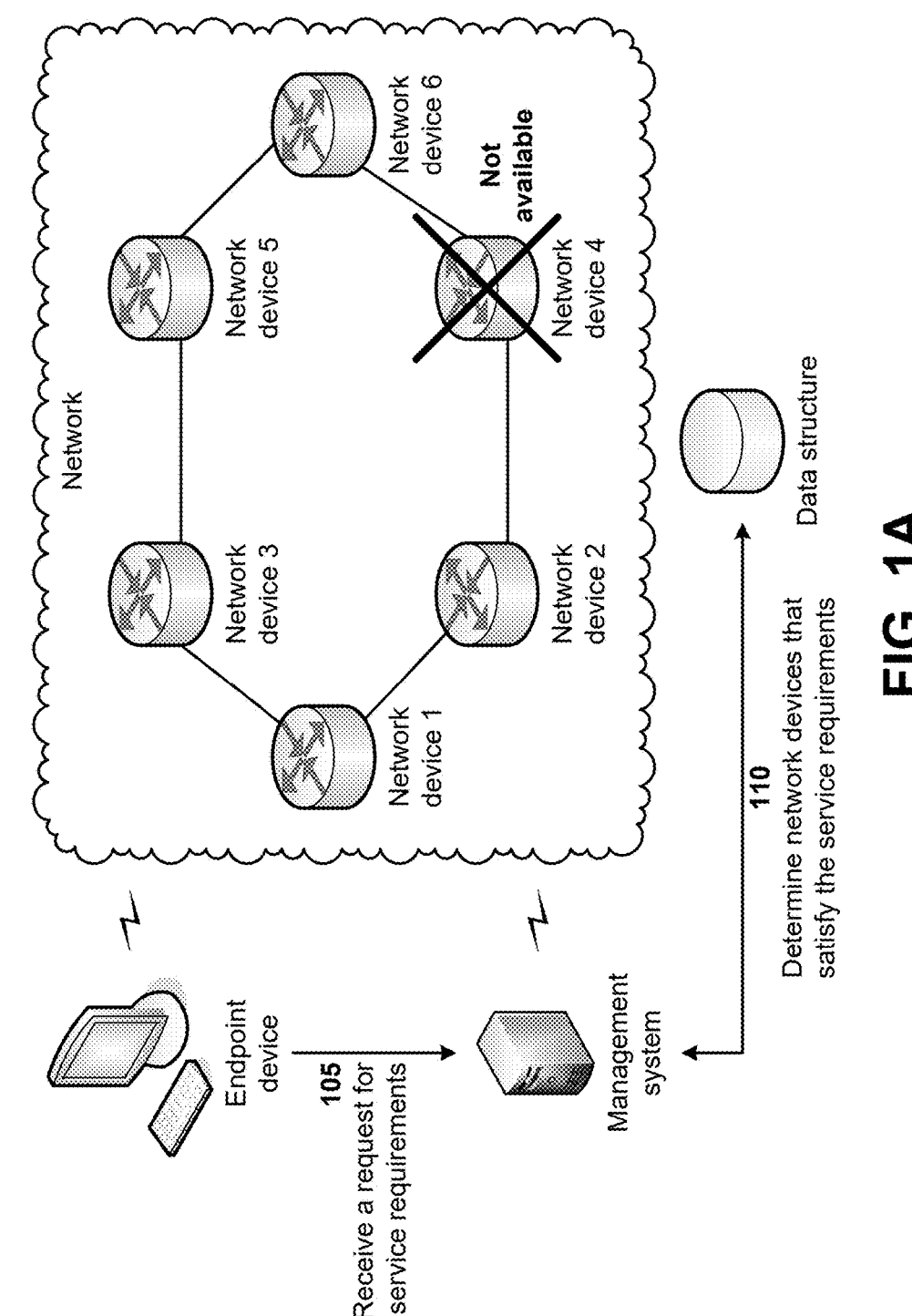
FIGS. 1A-1H are diagrams of an example associated with handling inconsistencies between service provisioning by network devices.

The following detailed description of example implementations refers to the accompanying drawings. The same reference numbers in different drawings may identify the same or similar elements.

Translating service requirements into a network configuration is a complex process that utilizes a placement method to allocate network devices (e.g., network devices, virtual network devices, network storage, and/or the like) that can be used to satisfy the service requirements. Identifiers of the network devices may be maintained in a data structure shared by all services and network devices in a network. The identifiers may include network addresses, network device identifiers, interface Internet protocol (IP) addresses, and/or the like. The identifiers may be translated into configuration parameters on network devices, and are required to be unique across the network.

During normal operation, the placement model may preserve the uniqueness of the identifiers by storing allocation states of the identifiers in a persistent database, which ensures that used network devices are not reallocated until relinquished. A challenge arises when the service provisioning system and the network are not synchronized. An example of this challenge is a change to a service that requires updating several network devices, some of which are unreachable. By default, the service provisioning system fails a request under such circumstances, preserving network resources that would otherwise have been released.

However, a user may ignore the failed request and proceed with unreachable network devices when a network device is removed from the network without properly being offboarded from the service provisioning system, when a virtual network device disappears after a power failure, when a user determines that a failure may be ignored, a change is urgently required on other network devices, and/or the like. If the service provisioning system releases a resource used by an unreachable network device under the assumption that the network device is removed, the network may experience severe disruption should the network device be brought back online with an earlier configuration containing stale resources. Nor can the network resource remain attached to a service, because the service has no real need for the network device. The service provisioning system may not permanently ban re-use of the unreachable network resources, because some of these network resources may be expensive and the user may want the service provisioning system to start using the network resources again.

Thus, current techniques for synchronizing network devices with service provisioning consume computing resources (e.g., processing resources, memory resources, communication resources, and/or the like), networking resources, and/or the like associated with causing severe network disruption when a removed network device is brought back online, failing to provide service based on utilizing unreachable network devices, handling a poor user experience caused by failing to provide service, banning re-use of expensive unreachable network devices, and/or the like.

Some implementations described herein relate to a management system for handling inconsistencies between service provisioning by network devices. For example, a management system may receive a request for service requirements, and may determine network devices that satisfy the service requirements. The management system may identify an unreachable network device from the network devices determined to satisfy the service requirements, and may deny the request based on the unreachable network device being unreachable. The management system may receive a command to proceed with the request, and may create an orphan service instance for resources used by the unreachable network device and service instances for resources used by the remaining network devices determined to satisfy the service requirements. The management system may associate a first device status (e.g., a down device status) with the orphan service instance, and may associate second device statuses (e.g., up device statuses) with the service instances. The management system may generate a service design based on the orphan service instance, the service instances, the first device status, and the second device statuses, and may utilize the service design to satisfy the service requirements.

As used herein the terms "network resource" or "resource" may refer a physical device (e.g., a network device, a server device, and/or the like), a conceptual resource (e.g., a bandwidth of a network device that is deduced as each service uses up bandwidth in the network device), an identity resource (e.g., an Internet protocol version 4 (IPv4) loopback address, a network device identifier, an interface IP address, and/or the like), and/or the like.

In this way, the management system may handle inconsistencies between service provisioning by network devices.

For example, when the management system identifies an unreachable network device and a user insists on utilizing the unreachable network device for service provision, the management system may orphan the unreachable network device that would otherwise have been released. The management system may create an orphan service instance that adopts ownership of the orphaned network device. The transfer of ownership may prevent the network device from being claimed by another service request. Except for the transfer of ownership, the orphan service instance may appear like a regular service instance to the placement model and the management system. The management system may treat the orphaned network device like a network device in use for service provisioning. Thus, the management system may conserve computing resources, networking resources, and/or the like that would otherwise have been consumed by causing severe network disruption when a removed network device is brought back online, failing to provide service based on utilizing unreachable network devices, handling a poor user experience caused by failing to provide service, banning re-use of expensive unreachable network devices, and/or the like.

FIGS. 1A-1H are diagrams of an example 100 associated with handling inconsistencies between service provisioning by network devices. As shown in FIG. 1A, the example 100 includes an endpoint device associated with a network, a management system, and a data structure (e.g., a database, a table, a list, and/or the like). The network may include multiple network devices, such as a first network device (e.g., network device 1), a second network device (e.g., network device 2), a third network device (e.g., network device 3), a fourth network device (e.g., network device 4), a fifth network device (e.g., network device 5), and a sixth network device (e.g., network device 6). Further details of the endpoint device, the management system, the data structure, the network, and the network devices are provided elsewhere herein.

As shown in FIG. 1A, and by reference number 105, the management system may receive a request for service requirements. For example, a user of the endpoint device may wish to receive a service provided by the network devices of the network, and may cause the endpoint device to generate the request for one or more service requirements of the service. The endpoint device may provide the request for the service requirements of the service to the management system, and the management system may receive the request for the service requirements. In some implementations, the service may include a network service (e.g., an application, such as a virtual reality application, an augmented reality application, a database application, and/or the like), a networking service (e.g., a routing service, a load balancing service, and/or the like), a storage service, and/or the like. The management system may receive the request and may identify the service requirements provided in the request.

As further shown in FIG. 1A, and by reference number 110, the management system may determine network devices that satisfy the service requirements. For example, the management system may be associated with the data structure, and the data structure may contain information identifying network devices (e.g., the network devices) of the network. The management system may translate the service requirements into a network configuration based on a placement model that allocates network devices that can be used to satisfy the service requirements. Identifiers of the network devices may be maintained in the data structure shared by the network devices of the network. The identifiers may include network addresses, network device identifiers, IP addresses, and/or the like. The identifiers may be translated into configuration parameters on the network devices, and are required to be unique across the network. The placement model may preserve the uniqueness of the identifiers by storing allocation states of the identifiers in the data structure, which ensures that used network devices are not reallocated until relinquished.

The management system may determine one or more network devices that satisfy the service requirements by identifying, in the data structure, the network devices that satisfy the service requirements and are available. For example, the management system may determine that the first network device, second network device, and the fourth network device may satisfy the service requirements based on querying the data structure for information identifying the network devices of the network (e.g., functions of the network devices, identifiers of the network devices, whether the network devices are currently allocated for other services, and/or the like).

Figure 1B:
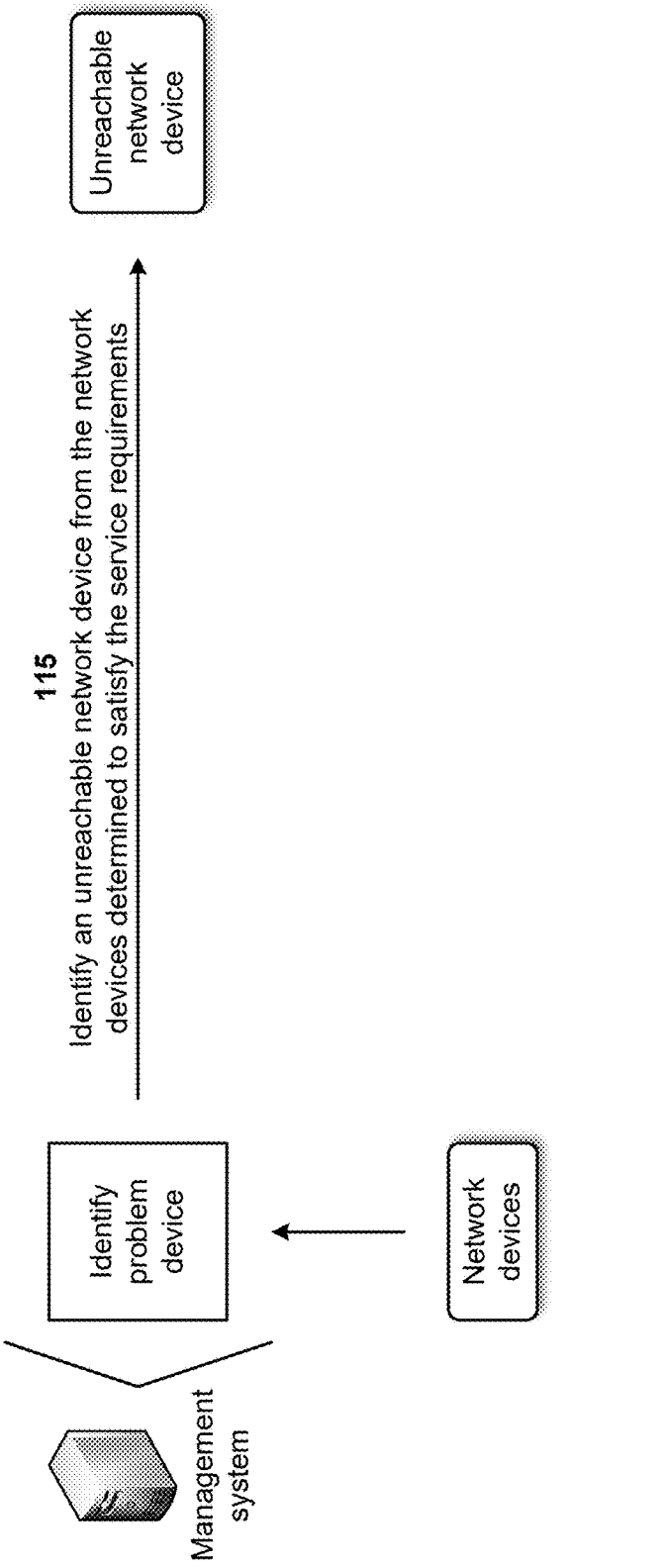

As shown in FIG. 1B, and by reference number 115, the management system may identify an unreachable network device from the network devices determined to satisfy the service requirements. For example, the management system may identify the unreachable network device from the one or more network devices determined to satisfy the one or more service requirements based on the unreachable network device being removed from the network, a power failure associated with the unreachable network device, a network error associated with the unreachable network device, and/or the like. In some implementations, the unreachable network device may be a network device, a virtual network device, a server device, a storage device, and/or the like. For example, as shown in FIG. 1A, the fourth network device may not be available (e.g., due to being unreachable) but may be determined to satisfy the service requirements by the management system. In such an example, the management system may identify the fourth network device as the unreachable network device from the network devices determined to satisfy the service requirements.

Figure 1C:
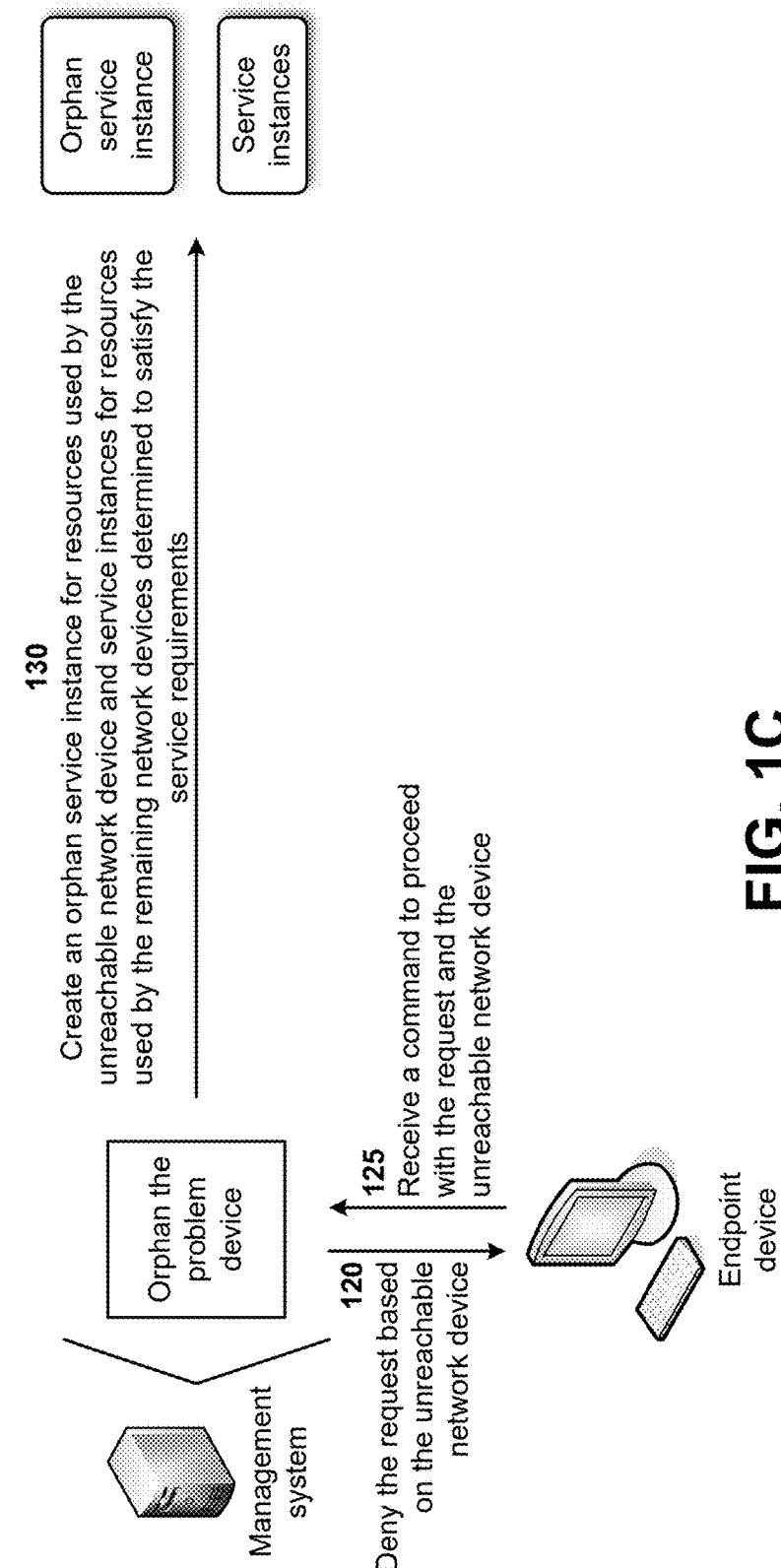

As shown in FIG. 1C, and by reference number 120, the management system may deny the request based on the unreachable network device. For example, since the network devices determined to satisfy the service requirements include the unreachable network device, the management system may deny the request for the service requirements of the service. The management system may deny the request in order to prevent the unreachable network device, which may be allocated to another service request, from being allocated to satisfying the service requirements for the endpoint device. This may prevent the network from experiencing a severe disruption should the unreachable network device be brought back online with an earlier configuration containing stale resources. The management system may generate a message denying the request, and may provide the message to the endpoint device. The endpoint device may receive the message denying the request, and may display the message to user of the endpoint device.

As further shown in FIG. 1C, and by reference number 125, the management system may receive a command to proceed with the request and the unreachable network device. For example, the user of the endpoint device may wish to ignore the failed request and proceed with satisfying the service requirements with the unreachable network device and the remaining network devices determined to satisfy the service requirements. The user may cause the endpoint device to generate the command to proceed with the request and the unreachable network device. The endpoint device may provide the command to proceed with the request and the unreachable network device to the management system, and the management system may receive the command from the endpoint device.

As further shown in FIG. 1C, and by reference number 130, the management system may create an orphan service instance resources used by for the unreachable network device and service instances for resources used by the remaining network devices determined to satisfy the service requirements. For example, based on the command, the management system may orphan the unreachable network device that would otherwise have been released. The management system may create an orphan service instance that adopts ownership of the orphaned unreachable network device. The transfer of ownership of the unreachable network device may prevent the unreachable network device from being claimed by another service instance. The management system may also create service instances for resources used by the remaining network devices determined to satisfy the service requirements. The orphan service instance and the service instances may be utilized by the management system to allocate the unreachable network device and the remaining network devices for provision of the service requirements to the endpoint device.

Figure 1D:
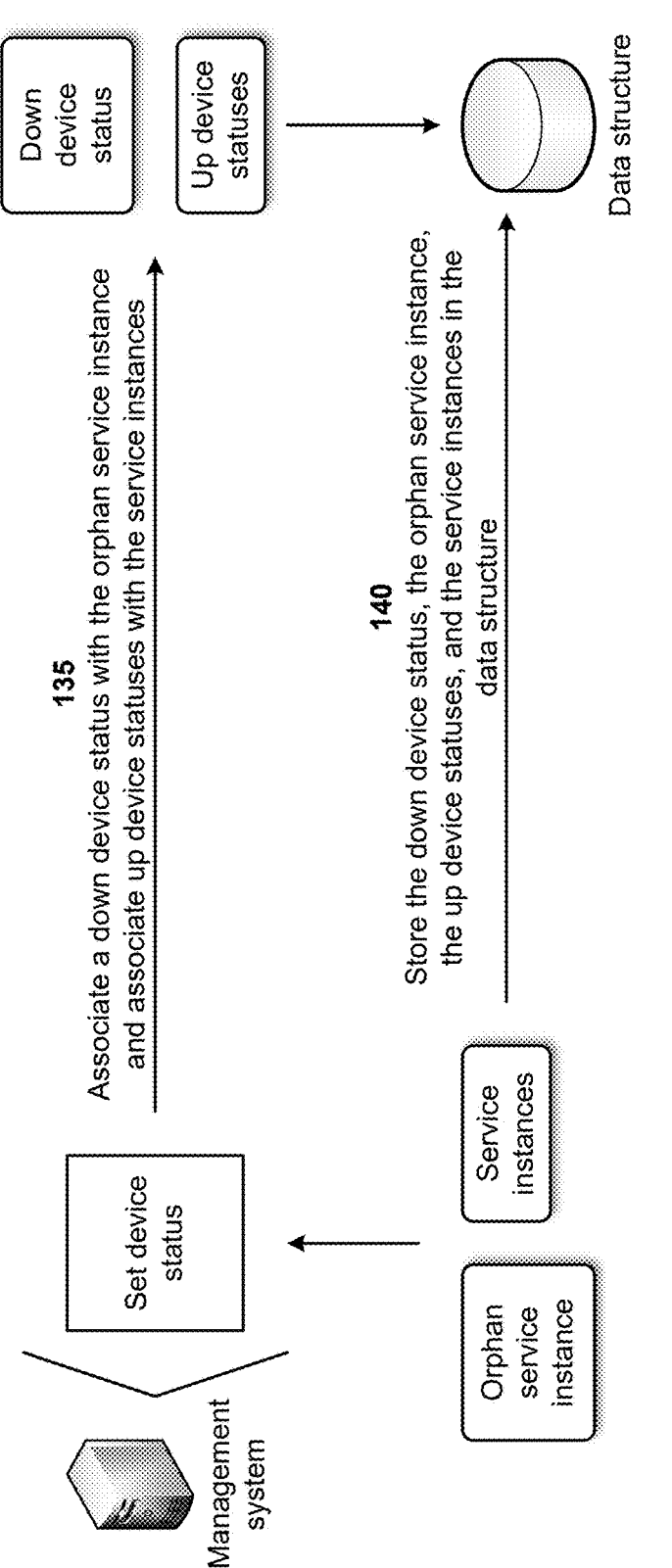

As shown in FIG. 1D, and by reference number 135, the management system may associate a down device status with the orphan service instance and may associate up device statuses with the service instances. For example, in order to transfer ownership of the unreachable network device and the remaining network devices, the management system may utilize a device status construct that tracks an operational status of a network device. The management system may associate a first device status (e.g., a down device status) with the orphan service instance and may associate second device statuses (e.g., up device statuses) with the service instances. A network device associated with a down device status may continue to be used by instances that specifically ask for the network device (e.g., to ensure that existing allocations are honored), but may not be allocated to any new instances that do not claim the network device. In some implementations, the management system may orphan a network device by setting the device status for the network device to a down state, updating the orphan service instance to claim the network device, and freeing the network device. The management system may invoke a service order on the orphan service instance. The service order may claim the network device based on the orphan service instance, and may restore a status of the network device after claiming the network device.

As further shown in FIG. 1D, and by reference number 140, the management system may store the down device status, the orphan service instance, the up device statuses, and the service instances in the data structure. For example, the management system and the network may be associated with a common data structure so that the management system and the network are synchronized with respect to allocated network devices. The management system may store the down device status, the orphan service instance, the up device statuses, and the service instances in the data structure so that the network is synchronized with the network devices associated with the down device status, the orphan service instance, the up device statuses, and the service instances.

Figure 1E:
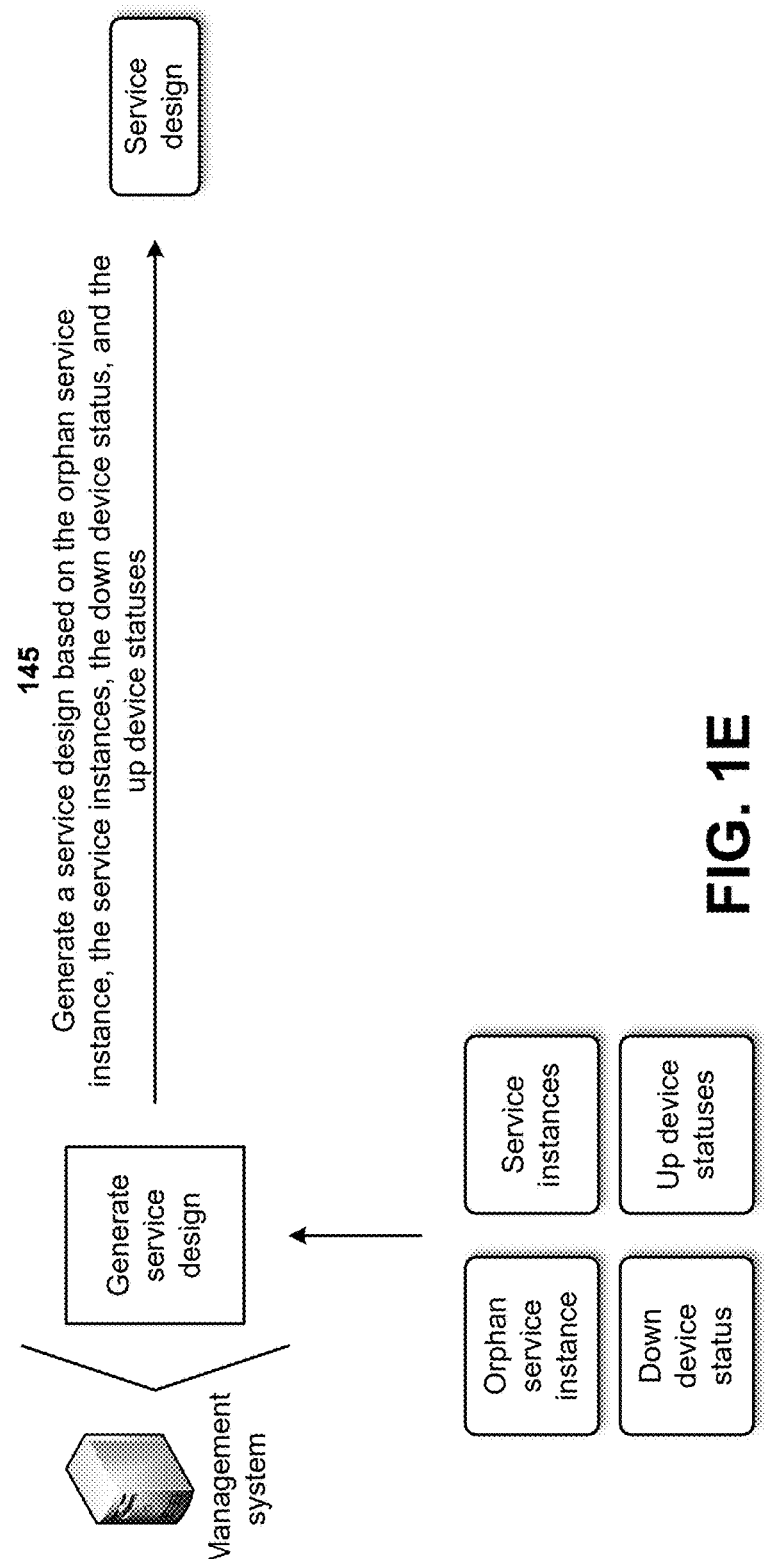

As shown in FIG. 1E, and by reference number 145, the management system may generate a service design based on the orphan service instance, the service instances, the down device status, and the up device statuses. For example, the management system may generate service designs that identify network devices to utilize to satisfy service requirements of service requests. The service designs, when executed, cause the management system to instruct the identified network devices to perform functions that satisfy the service requirements of the service requests. In some implementations, the management system may generate a service design that identifies the unreachable network device and the remaining network devices to utilize to satisfy the service requirements of the service request received from the endpoint device. The service design may identify the unreachable network device and the remaining network devices based on the orphan service instance, the service instances, the down device status, and the up device statuses. For example, the service design may include information identifying the unreachable network device, a time at which the orphan service instance was created, the device status of the unreachable network device, the remaining network devices, a time at which the service instances were created, the device statuses of the remaining network devices, the endpoint device that provided the request for the one or more service requirements, and/or the like.

Figure 1F:
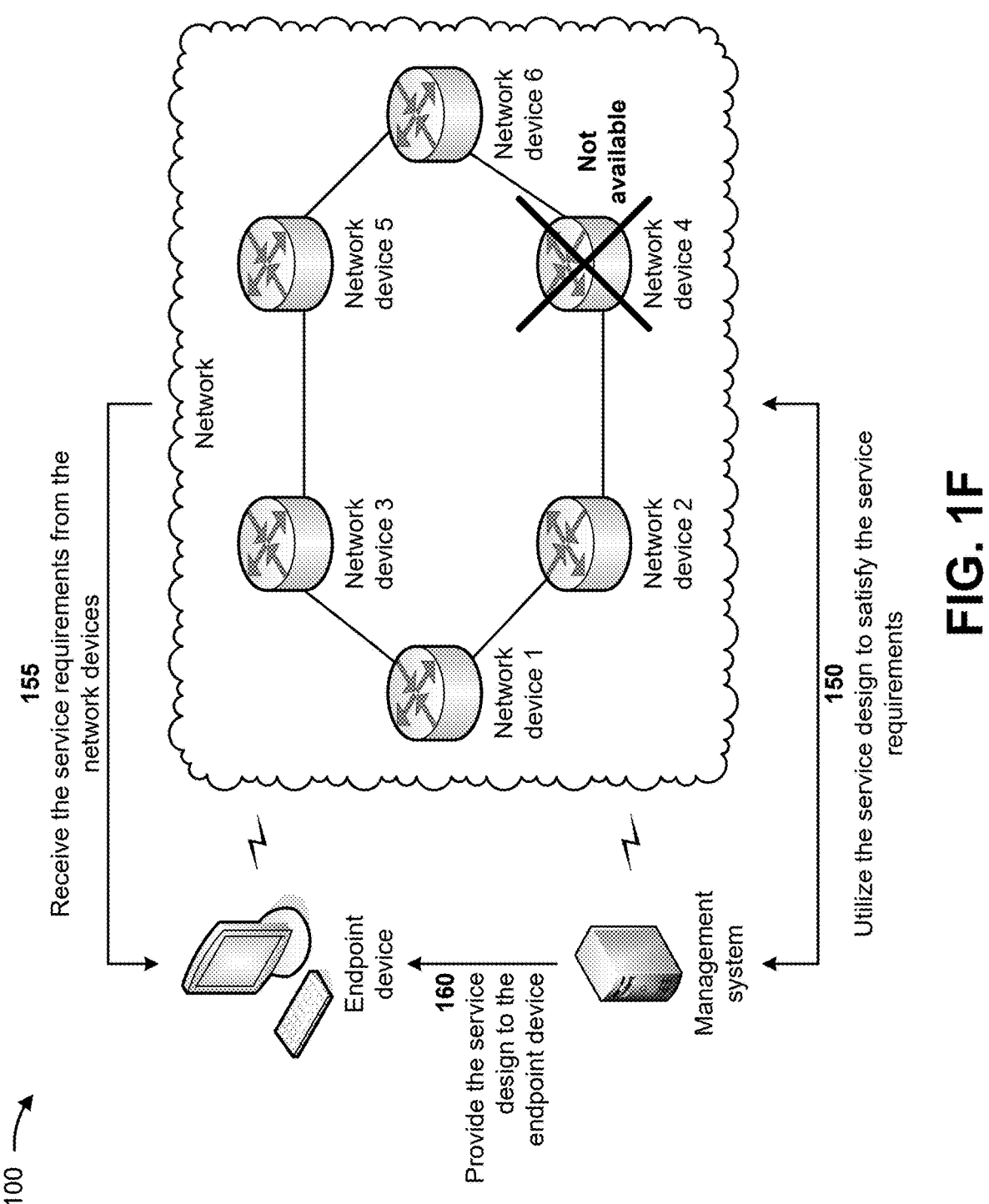

As shown in FIG. 1F, and by reference number 150, the management system may utilize the service design to cause the network devices to satisfy the service requirements. For example, the management system may execute the service design. When executed, the service design may cause the management system to instruct the network devices (e.g., including the unreachable network device) to perform functions that satisfy the service requirements for the endpoint device. In some implementations, the service design may cause the management system to provision the network devices with the information included in the service design so that the network devices may perform the functions that satisfy service requirements for the endpoint device.

As further shown in FIG. 1F, and by reference number 155, the endpoint device may receive the service requirements from the network devices. For example, the network devices may receive the information included in the service design, and may perform the functions that satisfy the service requirements based on the information included in the service design. Performance of the functions may cause the network devices to provide service requirements (e.g., for the service) the endpoint device, and the endpoint device may receive the service requirements (e.g., the service) from the network devices.

As further shown in FIG. 1F, and by reference number 160, the management system may provide the service design to the endpoint device. For example, the management system may provide the service design to the endpoint device, and the endpoint device may display the service design to the user of the endpoint device. In some implementations, the service design (e.g., including the orphan service instance and the service instances) may be viewed by the user via a user interface provided for display by the endpoint device. The user interface may also include other orphan service instances (e.g., for other service requests) so that user may view all of the orphaned network devices associated with the network. The user interface may assist the user in determining whether the orphaned network devices are ready for reuse. The user may perform necessary steps to ensure that stale references to the orphaned network devices have been released, such as manually removing stale configurations from the orphaned network devices, disconnecting the orphaned network devices from the network, and/or the like.

Figure 1G:
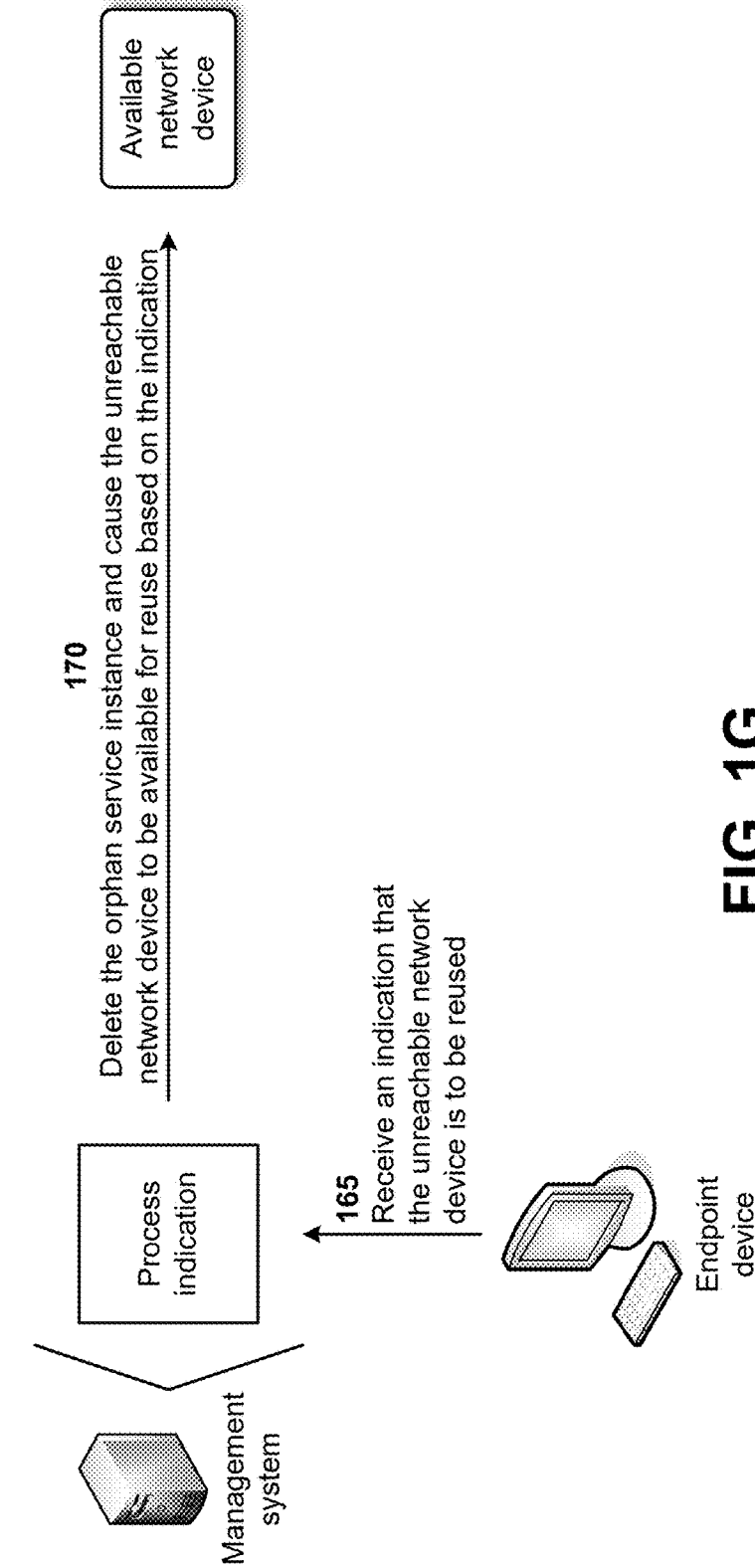

As shown in FIG. 1G, and by reference number 165, the management system may receive an indication that the unreachable network device is to be reused. For example, if the user deems an orphaned network device (e.g., the unreachable network device) fit for reuse, the user may cause the endpoint device to generate the indication that the unreachable network device is to be reused. The endpoint device may provide the indication that the unreachable network device is to be reused to the management system, and the management system may receive the indication from the endpoint device.

As further shown in FIG. 1G, and by reference number 170, the management system may delete the orphan service instance and may cause the unreachable network device to be available for reuse based on the indication. For example, when the management system receives the indication that the unreachable network device is to be reused, the management system may delete the orphan service instance, which removes the unreachable network device from the orphan service instance. The management system may cause the unreachable network device to be available for reuse and reallocation by returning the identifier of the unreachable network device to an available network device pool. Thus, the unreachable network device may be available for reuse by other service requests.

Figure 1H:
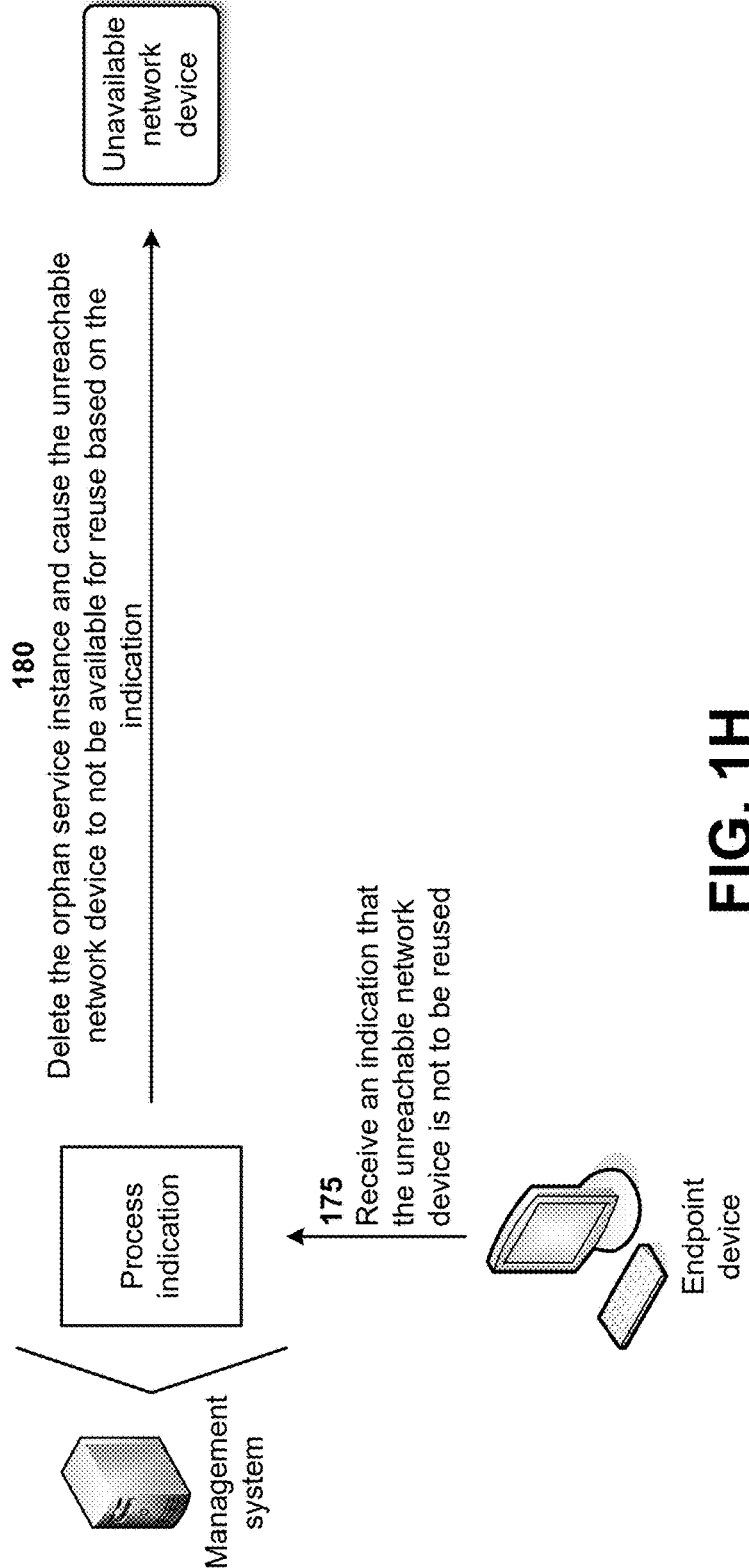

As shown in FIG. 1H, and by reference number 175, the management system may receive an indication that the unreachable network device is not to be reused. For example, if the user deems an orphaned network device (e.g., the unreachable network device) unfit for reuse, the user may cause the endpoint device to generate the indication that the unreachable network device is not to be reused. The endpoint device may provide the indication that the unreachable network device is not to be reused to the management system, and the management system may receive the indication from the endpoint device.

As further shown in FIG. 1H, and by reference number 180, the management system may delete the orphan service instance and may cause the unreachable network device to not be available for reuse based on the indication. For example, when the management system receives the indication that the unreachable network device is not to be reused, the management system may delete the orphan service instance, which removes the unreachable network device from the orphan service instance. The management system may cause the unreachable network device to not be available for reuse and reallocation by removing the identifier of the unreachable network device from the available network device pool. Thus, the unreachable network device may not be available for reuse by other service requests. In some implementations, the management system may remove the identifier of the unreachable network device from the available network device pool during a maintenance time window (e.g., when no services requests are pending with the management system) so that the unreachable network device is not accidentally claimed for use during the short time period before the identifier of the unreachable network device is removed from the available network device pool.

In this way, the management system may handle inconsistencies between service provisioning by network devices. For example, when the management system identifies an unreachable network device and a user insists on utilizing the unreachable network device for service provision, the management system may orphan the unreachable network device that would otherwise have been released. The management system may create an orphan service instance that adopts ownership of the orphaned network device. The transfer of ownership may prevent the network device from being claimed by another service request. Except for the transfer of ownership, the orphan service instance may appear like a regular service instance to the placement model and the management system. The management system may treat the orphaned network device like a network device in use for service provisioning.

Thus, the management system may conserve computing resources, networking resources, and/or the like that would otherwise have been consumed by causing severe network disruption when a removed network device is brought back online, failing to provide service based on utilizing unreachable network devices, handling a poor user experience caused by failing to provide service, banning re-use of expensive unreachable network devices, and/or the like. Furthermore, the management system safely handles inconsistencies and ensures that reuse of network devices with questionable statuses occurs only after due consideration and explicit approval by the user. The management system may enable the user to quickly review and perform actions on orphaned network devices, such reusing an orphaned network device or banning reuse of an orphaned network device.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
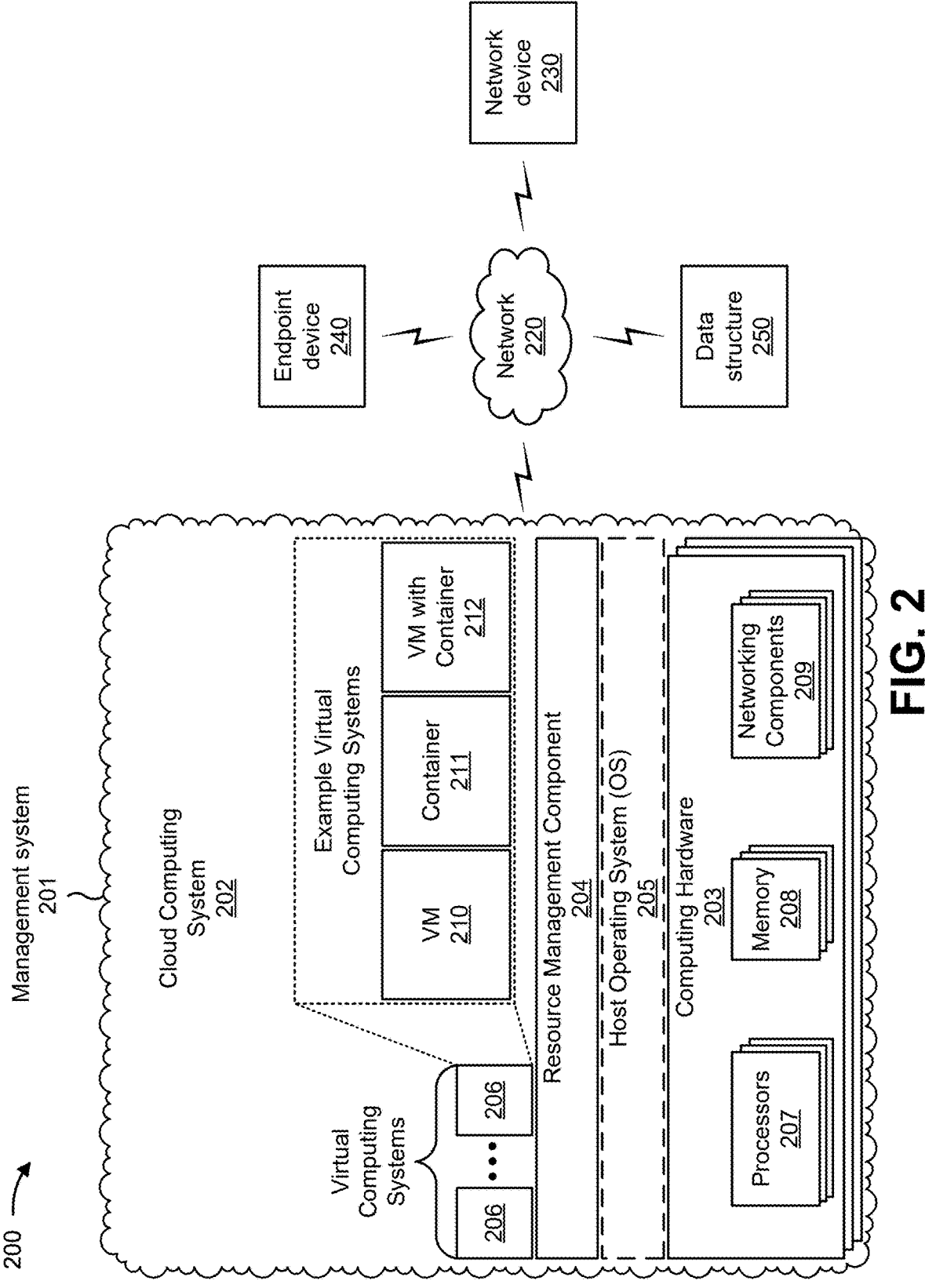
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a management system 201, which may include one or more elements of and/or may execute within a cloud computing system 202. The cloud computing system 202 may include one or more elements 203-212, as described in more detail below. As further shown in FIG. 2, the environment 200 may include a network 220, a network device 230, an endpoint device 240, and/or a data structure 250. Devices and/or elements of the environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as the computing hardware 203) capable of virtualizing the computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using the computing hardware 203. As shown, the virtual computing system 206 may include a virtual machine 210, a container 211, or a hybrid environment 212 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the management system 201 may include one or more elements 203-212 of the cloud computing system 202, may execute within the cloud computing system 202, and/or may be hosted within the cloud computing system 202, in some implementations, the management system 201 may not be cloud-based (e.g., may be implemented outside of a cloud computing system) or may be partially cloud-based. For example, the management system 201 may include one or more devices that are not part of the cloud computing system 202, such as a device 300 of FIG. 3, which may include a standalone server or another type of computing device. The management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The network device 230 may include one or more devices capable of receiving, processing, storing, routing, and/or providing traffic (e.g., a packet and/or other information or metadata) in a manner described herein. For example, the network device 230 may include a router, such as a label switching router (LSR), a label edge router (LER), an ingress router, an egress router, a provider router (e.g., a provider edge router or a provider core router), a virtual router, or another type of router. Additionally, or alternatively, the network device 230 may include a gateway, a switch, a firewall, a hub, a bridge, a reverse proxy, a server (e.g., a proxy server, a cloud server, or a data center server), a load balancer, and/or a similar device. In some implementations, the network device 230 may be a physical device implemented within a housing, such as a chassis. In some implementations, the network device 230 may be a virtual device implemented by one or more computing devices of a cloud computing environment or a data center. In some implementations, a group of network devices 230 may be a group of data center nodes that are used to route traffic flow through a network.

The endpoint device 240 may include one or more devices capable of receiving, generating, storing, processing, and/or providing information, as described elsewhere herein. The endpoint device 240 may include a communication device and/or a computing device. For example, the endpoint device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The data structure 250 may include one or more devices capable of receiving, generating, storing, processing, and/or providing information, as described elsewhere herein. The data structure 250 may include a communication device and/or a computing device. For example, the data structure 250 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 250 may communicate with one or more other devices of the environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
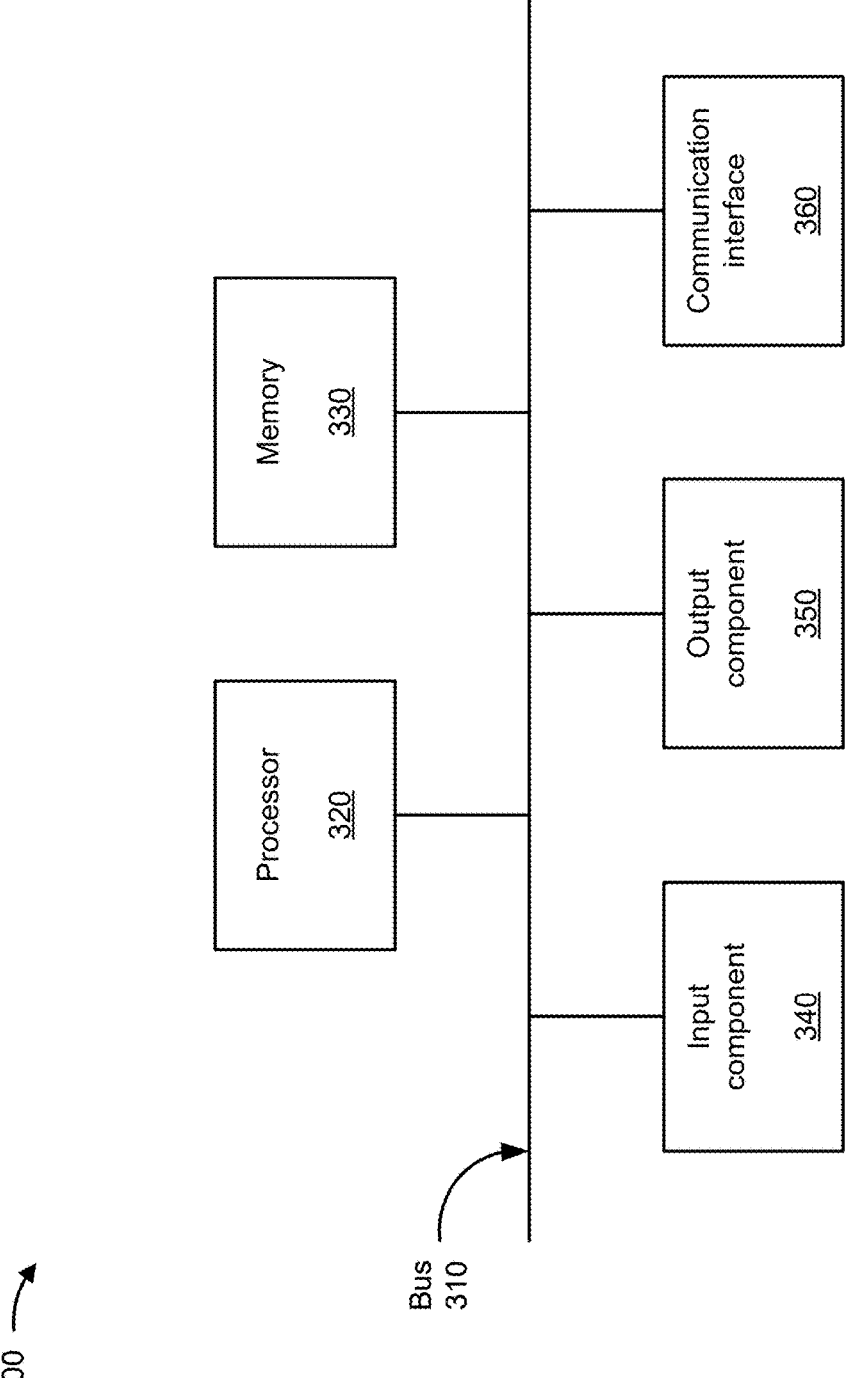
FIGS. 3 and 4 are diagrams of example components of one or more devices of FIG. 2.

FIG. 3 is a diagram of example components of one or more devices of FIG. 2. The example components may be included in a device 300, which may correspond to the management system 201, the network device 230, the endpoint device 240, and/or the data structure 250. In some implementations, the management system 201, the network device 230, the endpoint device 240, and/or the data structure 250 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), an accelerated processing unit (APU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
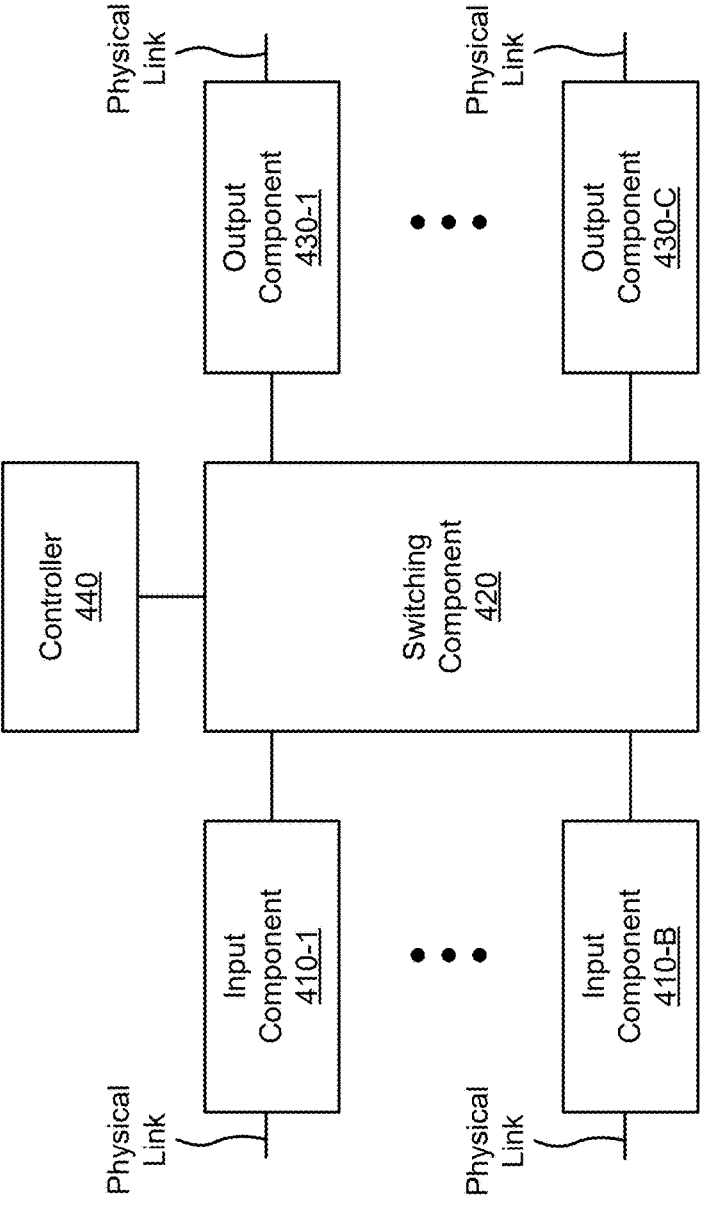

FIG. 4 is a diagram of example components of one or more devices of FIG. 2. The example components may be included in a device 400. The device 400 may correspond to the network device 230. In some implementations, the network device 230 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for handling inconsistencies between service provisioning by network devices. In some implementations, one or more process blocks of FIG. 5 may be performed by a device (e.g., the management system 201). In some implementations, one or more process blocks of FIG. 5 may be performed by another device or a group of devices separate from or including the device, such as an endpoint device (e.g., the endpoint device 240) and/or a network device (e.g., the network device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving a request for one or more service requirements (block 505). For example, the device may receive a request for one or more service requirements, as described above.

As further shown in FIG. 5, process 500 may include determining one or more network devices, associated with a network, that satisfy the one or more service requirements (block 510). For example, the device may determine one or more network devices, associated with a network, that satisfy the one or more service requirements, as described above.

As further shown in FIG. 5, process 500 may include identifying an unreachable network device from the one or more network devices determined to satisfy the one or more service requirements (block 515). For example, the device may identify an unreachable network device from the one or more network devices determined to satisfy the one or more service requirements, as described above. In some implementations, the unreachable network device is unreachable due to one of being removed from the network, a power failure, or a network error. In some implementations, the unreachable network device is a network device or a virtual network device.

As further shown in FIG. 5, process 500 may include denying the request based on the unreachable network device being unreachable (block 520). For example, the device may deny the request based on the unreachable network device being unreachable, as described above.

As further shown in FIG. 5, process 500 may include receiving a command to proceed with the request and the unreachable network device (block 525). For example, the device may receive a command to proceed with the request and the unreachable network device, as described above.

As further shown in FIG. 5, process 500 may include creating an orphan service instance for resources used by the unreachable network device and service instances for resources used by the remaining network devices determined to satisfy the one or more service requirements (block 530). For example, the device may create an orphan service instance for resources used by the unreachable network device and service instances for resources used by the remaining network devices determined to satisfy the one or more service requirements, as described above.

As further shown in FIG. 5, process 500 may include associating a first device status with the orphan service instance (block 535). For example, the device may associate a first device status with the orphan service instance, as described above. In some implementations, the first device status prevents the unreachable network device from being utilized for other service requests.

As further shown in FIG. 5, process 500 may include associating second device statuses with the service instances (block 540). For example, the device may associate second device statuses with the service instances, as described above. In some implementations, the first device status is a down device status and each of the second device statuses is an up device status.

As further shown in FIG. 5, process 500 may include generating a service design based on the orphan service instance, the service instances, the first device status, and the second device statuses (block 545). For example, the device may generate a service design based on the orphan service instance, the service instances, the first device status, and the second device statuses, as described above. In some implementations, the service design includes information identifying the unreachable network device, a time at which the orphan service instance was created, and an endpoint device that provided the request for the one or more service requirements.

As further shown in FIG. 5, process 500 may include utilizing the service design to satisfy the one or more service requirements (block 550). For example, the device may utilize the service design to satisfy the one or more service requirements, as described above. In some implementations, the request is received from an endpoint device and the service design causes the one or more network devices to satisfy the one or more service requirements for the endpoint device.

In some implementations, process 500 includes storing the first device status, the orphan service instance, the second device statuses, and the service instances in a data structure. In some implementations, process 500 includes receiving an indication that the unreachable network device is to be reused, deleting the orphan service instance based on the indication, and causing the unreachable network device to be available for reuse based on the indication. In some implementations, process 500 includes receiving an indication that the unreachable network device is not to be reused, deleting the orphan service instance based on the indication, and causing the unreachable network device to not be available for reuse based on the indication.

In some implementations, process 500 includes providing the orphan service instance for display to an endpoint device, and receiving, from the endpoint device, an indication of whether the unreachable network device is to be reused. In some implementations, process 500 includes deleting the orphan service instance based on the indication indicating that the unreachable network device is to be reused, and causing the unreachable network device to be available for reuse based on the indication indicating that the unreachable network device is to be reused. In some implementations, process 500 includes deleting the orphan service instance based on the indication indicating that the unreachable network device is not to be reused, and causing the unreachable network device to not be available for reuse based on the indication indicating that the unreachable network device is not to be reused.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a request for one or more service requirements;
   determining, by the device, one or more network devices, associated with a network, that satisfy the one or more service requirements;
   identifying, by the device, an unreachable network device from the one or more network devices determined to satisfy the one or more service requirements;
   receiving, by the device, a command to proceed with satisfying the one or more service requirements with the one or more network devices, including the unreachable network device;
   creating, by the device, an orphan service instance for resources used by the unreachable network device and service instances for resources used by remaining network devices determined to satisfy the one or more service requirements, wherein the orphan service instance adopts ownership of the unreachable network device and prevents the unreachable network device from being utilized for other service requests;
   generating, by the device, a service design based on the orphan service instance, the service instances, a first device status associated with the orphan service instance, and second device statuses associated with the service instances; and
   utilizing, by the device, the service design to satisfy the one or more service requirements.

2. The method of claim 1, wherein the first device status is a down device status and each of the second device statuses is an up device status.

3. The method of claim 1, further comprising:
   storing the first device status, the orphan service instance, the second device statuses, and the service instances in a data structure.

4. The method of claim 1, wherein the request is received from an endpoint device and the service design causes the one or more network devices to satisfy the one or more service requirements for the endpoint device.

5. The method of claim 1, further comprising:
   receiving an indication that the unreachable network device is to be reused;
   deleting the orphan service instance based on the indication; and
   causing the unreachable network device to be available for reuse based on the indication.

6. The method of claim 1, further comprising:
   receiving an indication that the unreachable network device is not to be reused;
   deleting the orphan service instance based on the indication; and
   causing the unreachable network device to not be available for reuse based on the indication.

7. The method of claim 1, wherein the unreachable network device is unreachable due to one of: being removed from the network, a power failure, or a network error.

8. A device, comprising:
   one or more memories; and
   one or more processors to:
      receive a request for one or more service requirements;
      determine one or more network devices, associated with a network, that satisfy the one or more service requirements;
      identify an unreachable network device from the one or more network devices determined to satisfy the one or more service requirements;
      receive a command to proceed to satisfy the one or more service requirements with the one or more network devices, including the unreachable network device;
      create an orphan service instance for resources used by the unreachable network device and service instances for resources used by remaining network devices determined to satisfy the one or more service requirements, wherein the orphan service instance adopts ownership of the unreachable network device and prevents the unreachable network device from being utilized for other service requests;
      generate a service design based on the orphan service instance, the service instances, a first device status associated with the orphan service instance, and second device statuses associated with the service instances; and
      utilize the service design to satisfy the one or more service requirements.

9. The device of claim 8, wherein the unreachable network device is a network device or a virtual network device.

10. The device of claim 8, wherein the service design includes information identifying the unreachable network device, a time at which the orphan service instance was created, and an endpoint device that provided the request for the one or more service requirements.

11. The device of claim 8, wherein the one or more processors are further to:

provide the orphan service instance for display to an endpoint device; and receive, from the endpoint device, an indication of whether the unreachable network device is to be reused.

12. The device of claim 11, wherein the one or more processors are further to:

delete the orphan service instance based on the indication indicating that the unreachable network device is to be reused; and cause the unreachable network device to be available for reuse based on the indication indicating that the unreachable network device is to be reused.

13. The device of claim 11, wherein the one or more processors are further to:

delete the orphan service instance based on the indication indicating that the unreachable network device is not to be reused; and cause the unreachable network device to not be available for reuse based on the indication indicating that the unreachable network device is not to be reused.

14. A non-transitory computer-readable medium storing a set of instructions, the set of instructions comprising:

one or more instructions that, when executed by one or more processors of a device, cause the device to:

receive, from an endpoint device, a request for one or more service requirements;

determine one or more network devices, associated with a network, that satisfy the one or more service requirements;

identify an unreachable network device from the one or more network devices determined to satisfy the one or more service requirements;

receive a command to proceed to satisfy the one or more service requirements with the one or more network devices, including the unreachable network device;

create an orphan service instance for resources used by the unreachable network device and service instances for resources used by remaining network devices determined to satisfy the one or more service requirements, wherein the orphan service instance adopts ownership of the unreachable network device and prevents the unreachable network device from being utilized for other service requests;

generate a service design based on the orphan service instance, the service instances, a first device status associated with the orphan service instance, and second device statuses associated with the service instances; and utilize the service design to satisfy the one or more service requirements for the endpoint device.

15. The non-transitory computer-readable medium of claim 14, wherein the one or more instructions further cause the device to:

receive an indication that the unreachable network device is to be reused;

delete the orphan service instance based on the indication; and cause the unreachable network device to be available for reuse based on the indication.

16. The non-transitory computer-readable medium of claim 14, wherein the one or more instructions further cause the device to:

receive an indication that the unreachable network device is not to be reused;

delete the orphan service instance based on the indication; and cause the unreachable network device to not be available for reuse based on the indication.

17. The non-transitory computer-readable medium of claim 14, wherein the service design includes information identifying the unreachable network device, a time at which the orphan service instance was created, and an endpoint device that provided the request for the one or more service requirements.

18. The non-transitory computer-readable medium of claim 14, wherein the one or more instructions further cause the device to:

provide the orphan service instance for display to the endpoint device;

receive, from the endpoint device, an indication of whether the unreachable network device is to be reused; and selectively:

cause the unreachable network device to be available for reuse based on the indication indicating that the unreachable network device is to be reused, or cause the unreachable network device to not be available for reuse based on the indication indicating that the unreachable network device is not to be reused.

19. The device of claim 8, wherein the first device status is a down device status and each of the second device statuses is an up device status.

20. The non-transitory computer-readable medium of claim 14, wherein the first device status is a down device status and each of the second device statuses is an up device status.

* * * * *